April 22, 1941.  N. D. LEVICK  2,239,392

DENTAL ACCESSORY DEVICE

Filed Aug. 12, 1939

INVENTOR
Nathan D. Levick
BY
Louis Shumacher
ATTORNEY

Patented Apr. 22, 1941

2,239,392

UNITED STATES PATENT OFFICE 2,239,392

DENTAL ACCESSORY DEVICE

Nathan D. Levick, New York, N. Y.

Application August 12, 1939, Serial No. 289,779

9 Claims. (Cl. 211—57)

This invention relates to tray devices and has particular reference to dental accessories.

One object of the invention is to provide improved means conducive to sanitary work in a convenient manner on a table or tray such as a dental tray.

The invention will be best understood by considering the difficulties perceived in connection with dental trays. The rotary, swingable dental tray, provided adjacent to the dental chair, is generally covered with a sheet of paper upon which are disposed the dental tools that are in use, and on which are placed soiled cotton and debris removed from the mouth of the patient. For sanitary reasons, this sheet of paper covers the entire tray, and hence the usual medicaments, antiseptics, and the like, also stand on this paper sheet. When the work on the patient is completed, the tools are placed in a sterilizer, and the paper sheet must be removed and replaced. This necessitates the removal and replacement of the bottles of medication, antiseptic, and the like; to avoid the duplication of work and loss of time incident to this operation is one of the essential purposes of this invention.

The invention accordingly aims to provide improved means whereby the paper sheet can be replaced without disturbing or handling the containers of medicine, antiseptic, and the like, that are usually disposed on a dental tray; and a supplemental object of the invention is to provide improved means for the replacement of the soiled paper sheet with a minimum of handling.

Another object of the invention is to provide for the automatic accurate placement of the new paper sheet on the dental tray and for the reliable maintained positioning of said sheet on the dental tray.

Another object of the invention is to provide for the cutting of the soiled sheet of paper for complete release thereof upon exerting a pull thereon.

As heretofore used, the paper sheet was often inaccurately positioned on the dental tray, or slipped to a side, thus tending to defeat the sanitary requirements.

The invention is not limited to the use of discardable sheets of paper or the like. For example, a single sheet of rubber, rubberized composition or other suitable material may be employed, and removed and cleaned in the sterilizer or otherwise. If preferred, two such sheets, or "covers," as they are preferably termed, may be employed so that one is alternatively in the sterilizer while the other is in use.

It is therefore a further object of the invention to realize all of the advantages and avoid all of the difficulties above noted, and to provide a simple, neat and inexpensive device, that may be readily applied to any dental tray, and which will function in a durable, reliable and highly efficient manner.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

Figure 1:
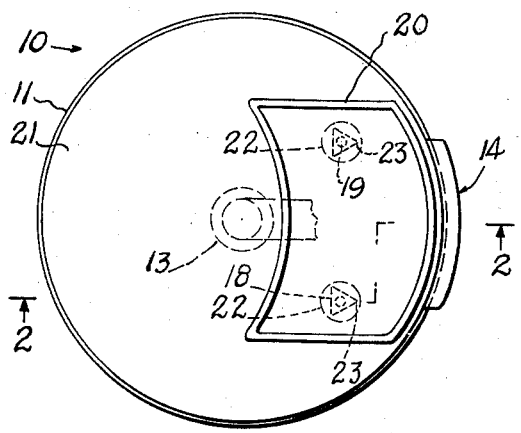
Figure 1 is a plan view showing a dental accessory device embodying the invention.
Figure 3:
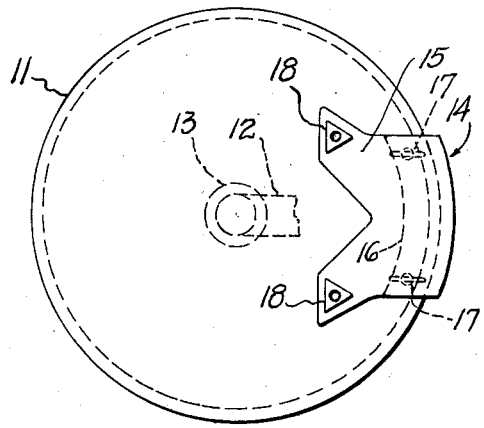
Fig. 3 is a plan view of the device with the superimposed auxiliary tray removed for the placement of a stack of paper sheets.
Figure 2:
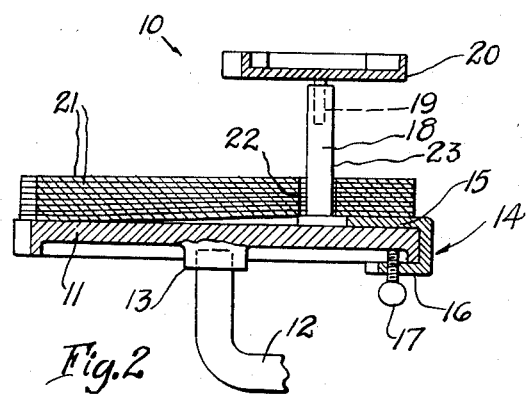
Fig. 2 is a vertical section view thereof taken on the broken line 2—2 of Fig. 1.
Figure 4:
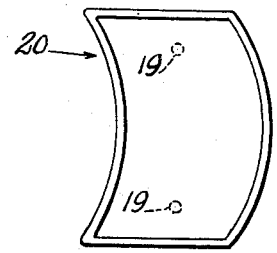
Fig. 4 is a plan view of the auxiliary tray in removed position.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a tray device, such as a dental accessory of that general character, embodying the invention. The same may include a table or main tray 11 mounted in any suitable manner, preferably on an arm 12, which is swingable and upon which the tray may be journaled as in the bearing 13, so that the tray may be moved to a desired position and rotated for easy access to any part thereof.

The tray 11 may have a holding means or portion, preferably in the nature of any clamp 14 designed so as to be readily applicable to marginal portions of trays of different constructions. For instance, the clamp may include a top plate or jaw 15, and a bottom jaw 16 carrying a plurality of spaced screws 17 for clampingly engaging the tray between said jaws. In general, the jaw 15 is thin, and the clamp conforms substantially to the curvature of the edge of the tray 11, and is so arranged as to project as little as possible, so as not to interfere with the Bunsen burner which is generally mounted near the far side of the tray. In other words, the clamp 14 is located at the rear of the tray, remotely from the dental chair.

Fixed on the jaw 15 are a plurality of vertical spaced standards 18. Desirably the latter have sleeved engagement with pins or rods 19 affixed to the auxiliary tray 20 at the underside thereof to mount the tray 20 in horizontal position, spaced over the main tray 11. The auxiliary tray may be of any suitable shape, and is substantially smaller than the main tray, and positioned mainly at one side of the latter, for instance, in relatively off-center relation thereto. The auxiliary tray may also be spaced inward of certain sides of the main tray, the purpose being to leave a large part of the main tray fully exposed and free for observation and access, without encumbrance by the superposed auxiliary tray.

Resting on the main tray 11 and underlying the auxiliary tray 20 are one or more cover elements such as a stack of sanitary paper sheets 21. The latter may have spaced holes 22 to receive the standards 18 and conforms to the shape of the main tray 11, and covers the latter substantially entirely. In this connection, it may be pointed out that the circular or arcuate shapes herein shown are merely illustrative, and that the terms "off-center," "excentric," are conveniently used herein in a general sense and without limitation.

Extending along the standards 18 are the longitudinal portions or edges 23 which face rearward and are preferably formed by using triangular members. These edges serve to slit the paper 21 from the holes 22 thereof.

The manner of using the invention will now be briefly described. The clamp 14 having been secured in position, a stack of paper 21 is placed over the main tray 11 so that the standards 18 pass through the preformed holes 22 of the paper, and rest on the main tray in accurate position. Now the auxiliary tray 20 is applied by inserting its pins 19 into the central bores of the standards 18. The containers of medication, antiseptic, and the like may be placed on the auxiliary tray and the necessary dental tools and articles are placed on the top of the paper stack 21. Then the soiled tools and articles, as well as debris from the mouth of the patient may be placed on the stack 21, so that only the topmost sheet becomes unsanitary. When the work on the patient has been completed, the dental tools and articles may be removed and a forward pull exerted on the topmost paper sheet 21 to cause the cutting edges at 23 to tear or slit the paper from the holes 22 to the rear edge for easy removal of the paper. In fact, the topmost sheet may be thus removed with certain articles, such as soiled cotton, remaining thereon to be discarded together with the paper. A new sheet of paper is now present in proper position and covering the entire main tray. Nevertheless, none of the articles on the auxiliary tray 20 were disturbed or required handling to effect this change of the paper 21.

Figure 5:
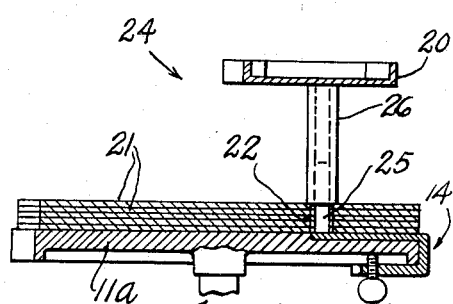
Fig. 5 is a view, similar to that of Fig. 2 showing a modification of the invention.

In Fig. 5 is shown a modification 24 which is like the device 10, except that weight of the auxiliary tray 20 is utilized to hold down, if need be, the paper sheets 21 on the main tray 11a. For this purpose, the elements 18, 19, forming the columns supporting the auxiliary tray 20 have been constructed so that triangular or other cutting elements 25, similar to those at 18, are fixed on the clamp 14 in upward projecting position, and the elements 26 similar to those at 19, may be round tubes fixed to the auxiliary tray 20 and adapted to axially removably receive the elements 25. By using tubes 26 of larger outside diameter than the holes 22 in the paper sheets 21, said tubes bear down on the stack of papers to prevent the sheets from being affected by wind. In operation the device 24 functions like the device 10.

Figure 6:
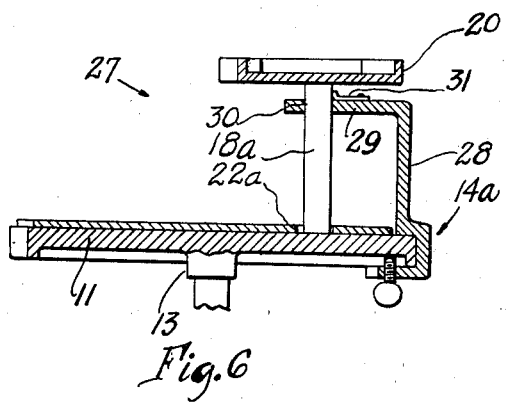
Fig. 6 is a view like that of Fig. 2 showing a further modification of the invention.

In Fig. 6 is shown a further modification 27 which is operative in a manner generally like that of the device 10, except that the auxiliary tray 20 need not be wholly removed in order to place a new stack of paper 21 on the main tray, or to replace a cover element on the latter. In fact, the device may reliably hold the auxiliary tray while the cover is being replaced. Thus any clamp 14a may be provided, like the clamp 14, but having an upright bracket 28 near the edge of the main tray, carrying an inward extending plate or arm 29. Fixed to the auxiliary tray 20, are the triangular or cutting elements 18a, like those at 18, extending slidably downward through holes 30 in the arm 29, and thence through the holes 22a of the cover element 21a, the latter being like the sheet 22, but being adapted to be washed or sterilized. The lower end of the element 18a may rest squarely on the main tray to support the auxiliary tray and reliably hold the cover 21a. Hence the cover may be replaced by merely raising the auxiliary tray with the arm 29 serving as a guide to prevent spilling of liquids.

If desired, the element 18a may have stop engagement with the arm 29, frictionally or otherwise, as by a strip spring 31 extending along and secured to the arm 29 on the upper face thereof, the free end portion of said spring being upwardly curved and frictionally contacting a suitable edge or face of the element 18a. Hence the tray 20 may be easily raised, the spring 31 yielding, and may hold the tray at any desired elevation, the latter being lowered by pushing down thereon with the element 18a slipping against the spring. In other respects, the device 27 may be like the device 10.

I claim:

1. A device including a main dental tray having an upright cutting element at the top face of the tray, said element being rigidly affixed to the tray and being located more closely to one edge of the tray than to other edges thereof with the cutting edge facing toward said edge, said tray being adapted to receive a stack of individually removable loose paper sheets perforated to receive the cutting element and to be cut thereby on horizontally pulling a sheet, and an upright tube weighted by an auxiliary tray smaller than the main tray and carried by the tube at its upper end, said tube being removably sleeved over the cutting element and having a lower edge portion adapted to bear down upon said stack at the marginal portions of the perforation to hold the sheets down, said tube being downwardly movable as the stack diminishes to wholly cover the cutting edge.

2. A device including a main dental tray having an upright cutting element at the top face of the tray, said element being rigidly affixed to the tray and being located more closely to one edge of the tray than to other edges thereof with the cutting edge facing toward said edge, said tray being adapted to receive a stack of individually removable loose paper sheets perforated to receive the cutting element and to be cut thereby on horizontally pulling a sheet, and an upright tube weighted to carry at its upper end an auxiliary tray as a weight for the tube, said tube being removably sleeved over the cutting element and having a lower edge portion adapted to bear down on the said stack, with the sleeve being downwardly movable as the stack diminishes to wholly cover the cutting edge.

3. A device including a main dental tray having an upright cutting element at the top face of the tray, said element being rigidly affixed to the tray and being located more closely to one edge of the tray than to other edges thereof with the cutting edge facing toward said edge, said tray being adapted to receive a stack of individually removable loose paper sheets perforated to receive the cutting element and to be cut thereby on horizontally pulling a sheet, and an upright tube removably sleeved over the cutting element and having sufficient weight and a bottom edge portion to bear down on top of the stack to hold down said sheets, with the tube being of sufficient length and serving as a follower to cover the cutting edge of said element as the stack diminishes.

4. A dental accessory including a main tray and an auxiliary tray smaller than the main tray and mounted above the latter in off center relation thereto in order to leave unobstructed a substantial portion of the main tray, and means interconnecting said trays located under the auxiliary tray adjacent to one side of the main tray and including a plurality of telescopically interengaging elements, one of which is fixed to the main tray and the other to the auxiliary tray, the element affixed to the main tray having an upright cutting edge facing toward the said side of the main tray and serving to cut sheets of paper on the main tray engaged around the cutting element, said elements being disengageable with each other for replacement of said sheets.

5. A dental accessory device including an auxiliary tray adapted to be mounted over a main tray, and a support for said auxiliary tray including a plurality of members telescopically interengaging each other in an upright direction, the support including a clamp attachable to the main tray at an edge thereof and having a portion for closely overlying the main tray, one of the members being fixedly connected to the auxiliary tray, the other member being fixedly connected to the said clamp at said overlying portion and having an upright cutting edge facing toward said clamp, as and for the purpose set forth.

6. A dental accessory device including an auxiliary tray adapted to be mounted over a main tray, and a support for said auxiliary tray including a plurality of members telescopically interengaging each other in an upright direction, the support including a clamp attachable to the main tray at an edge thereof and having a portion for closely overlying the main tray, one of the members being fixedly connected to the auxiliary tray, the other member being fixedly connected to the said clamp at said overlying portion and having an upright cutting edge facing toward said clamp, the member connected to the auxiliary tray being sleeved over the companion member for covering the cutting edge of the latter.

7. A dental accessory device including an auxiliary tray adapted to be mounted over a main tray, and a support for said auxiliary tray including a plurality of members telescopically interengaging each other in an upright direction, the support including a clamp attachable to the main tray at an edge thereof and having a portion for closely overlying the main tray, one of the members being fixedly connected to the auxiliary tray, the other member being fixedly connected to the said clamp at said overlying portion and having an upright cutting edge facing toward said clamp, the member connected to the auxiliary tray being sleeved over the companion member for covering the cutting edge of the latter and having at its bottom a portion for bearing downward on a stack of paper sheets that are to be cut by said cutting edge and being of sufficient length to continuously cover the cutting edge as the stack diminishes.

8. A dental accessory device including an auxiliary tray adapted to be mounted over a main tray, and a support for said auxiliary tray including a plurality of members slidingly detachably interengaging each other in an upright direction, one of said members being fixed to the auxiliary tray, a clamp to which the other member is fixed for engaging an edge of a main tray, one of said members having a portion extending downward substantially to the plane of the clamp and having an exposed upright knife edge facing toward the clamp.

9. As a new article of manufacture, a dental accessory device adapted to be mounted over a main tray, comprising an arcuate tray, and a support therefor including a plurality of members slidably interengaging each other in an upright direction, and a clamp connected to one of said members having a U-shaped element adapted to receive an edge portion of the main tray and affording a section overlying said edge portion, one of said members being connected to said section adjacent to the inner end thereof, and one of said members having an upright knife edge facing toward said clamp and extending down to said section.

NATHAN D. LEVICK.